US012797882B2

(12) United States Patent
Alluigi

(10) Patent No.: US 12,797,882 B2
(45) Date of Patent: Nov. 17, 2026

(54) TRIGGER DISPENSING DEVICE FOR UPSIDE DOWN OPERATION

(71) Applicant: GUALA DISPENSING S.P.A., Alessandria (IT)

(72) Inventor: Riccardo Alluigi, Alessandria (IT)

(73) Assignee: Guala Dispensing S.P.A., Alessandria (IT)

(*) Notice: Subject to any disclaimer, the term of this patent is extended or adjusted under 35 U.S.C. 154(b) by 0 days.

(21) Appl. No.: 19/106,338

(22) PCT Filed: Oct. 25, 2023

(86) PCT No.: PCT/IB2023/060747

§ 371 (c)(1),
(2) Date: Feb. 25, 2025

(87) PCT Pub. No.: WO2024/089611

PCT Pub. Date: May 2, 2024

(65) Prior Publication Data

US 2026/0061443 A1 Mar. 5, 2026

(30) Foreign Application Priority Data

Oct. 28, 2022 (IT) ........................ 102022000022290

(51) Int. Cl.

*B05B 11/10* (2023.01)
*B05B 11/00* (2023.01)

(52) U.S. Cl.

CPC ...... *B05B 11/1057* (2023.01); *B05B 11/0059* (2013.01); *B05B 11/0008* (2013.01); *B05B 11/1001* (2023.01); *B05B 11/1009* (2023.01)

(58) Field of Classification Search

CPC ............. B05B 11/1057; B05B 11/1064; B05B 11/0059; B05B 11/1011; B05B 11/0044;
(Continued)

(56) References Cited

U.S. PATENT DOCUMENTS 5,119,974 A * 6/1992 Mann .................. B05B 11/1011 222/376
5,341,967 A 8/1994 Silvenis
(Continued)

FOREIGN PATENT DOCUMENTS

CN 2717537 Y 8/2005
DE 19882071 T1 3/2000
(Continued)

OTHER PUBLICATIONS

International Search Report for International Patent Application No. PCT/IB2023/060747, mailed Feb. 12, 2024.
(Continued)

*Primary Examiner* — David J Walczak
(74) *Attorney, Agent, or Firm* — Armstrong Teasdale LLP

(57) ABSTRACT

A trigger head for a dispensing device for a liquid product that is usable an "upright" configuration and an "upside down" configuration has an attachment having an attachment suction chamber, a multifunction chamber and an auxiliary passage. The trigger head has multifunction valves operating in the multifunction chamber, which, in the "upright" configuration, close a communication between the multifunction chamber and a bottle compartment of a bottle of the dispensing device and, in the "upside down" configuration, close a communication between a multifunction passage of the multifunction chamber and a venting conduit of the trigger head.

21 Claims, 4 Drawing Sheets

(58) Field of Classification Search
CPC ............ B05B 11/0008; B05B 11/1001; B05B 11/1009; B05B 9/043; A62C 11/00; B67D 7/60; B67D 7/58
USPC .. 222/402.19, 402.15, 383.1, 384, 376, 372, 222/481, 481.5, 482; 239/525, 526, 527
See application file for complete search history.

(56) References Cited

U.S. PATENT DOCUMENTS

| | | | |
|---|---|---|---|
| 5,467,901 A | 11/1995 | Foster et al. | |
| 6,386,399 B1 * | 5/2002 | Tsujii .................. | B05B 11/0059 222/376 |
| 10,406,548 B2 * | 9/2019 | Fujiwara ............. | B05B 11/0059 |
| 11,596,961 B2 * | 3/2023 | Knight .............. | B05B 11/00442 |

FOREIGN PATENT DOCUMENTS

| | | |
|---|---|---|
| IT | 102022000021228 A1 | 4/2024 |
| WO | 2022011811 A1 | 1/2022 |
| WO | 2024079540 A1 | 4/2024 |

OTHER PUBLICATIONS

Search Report for Italian Patent Application IT 202200022290, mailed May 11, 2023, Munich, DE.

* cited by examiner

TRIGGER DISPENSING DEVICE FOR UPSIDE DOWN OPERATION

CROSS-REFERENCE TO RELATED APPLICATIONS

This application is a National Phase Application of PCT International Application No. PCT/IB2023/060747, having an International Filing Date of Oct. 25, 2023 which claims priority to Italian Application No. 102022000022290 filed Oct. 28, 2022, each of which is hereby incorporated by reference in its entirety.

TECHNICAL FIELD

The present invention is in the field of trigger dispensing devices for liquid products generally intended for household cleaning and hygiene, room freshening, personal hygiene and care, clothing care, and the like. In particular, the subject matter of the present invention is a trigger dispensing device capable of smooth operation even when upside down.

PRIOR ART

Trigger dispensing devices have experienced enormous popularity over the years. They are appreciated by consumers for the great convenience of use and lately also for the possibility of being reused several times, refilling them when necessary with the desired product, and, at least in the case of some versions, for the possibility of disposal in plastic waste. Several hundred million pieces are now produced each year.

One of the requirements of the industry is to also use a device in an inverted position, that is, a position in which the bottle or vial applied to the dispensing head is partially or completely above the dispensing head. Regular operation in the upside-down position allows the user to direct the jet to hard-to-reach areas, such as under the inner edge of some toilets.

Very often, such devices do not work smoothly in the upside-down position; one of the drawbacks usually encountered is, for example, that the product leaks from the container, often through the venting passage, i.e., the passage that, when the device is used normally, allows air from the external environment to enter the bottle during the suction phase of the product from the bottle to the dispensing head.

An example embodiment of a trigger dispensing device that may be used in the upside-down position is described in WO-A1-2022/011811. Further examples of trigger dispensing devices of this type are described in U.S. Pat. Nos. 5,341,967, 5,467,901, DE-T1-19882071, CN-Y-2717537 and WO-A1-2022/011811.

However, the devices known today often have high complexity. Given the production volumes involved, it makes sense to find simpler solutions that may simplify production of the components and the assembly of the dispensing head.

OBJECT OF THE INVENTION

The object of the present invention is to construct a trigger dispensing device for a liquid product that meets the needs of the industry and overcomes the drawbacks mentioned above.

This object is achieved by a trigger dispensing head as described and claimed herein. Advantageous embodiments of the present invention are also described.

BRIEF DESCRIPTION OF THE FIGURES

The features and advantages of the trigger dispensing head according to the present invention will be apparent from the description mentioned below, given by way of non-limiting example in accordance with the figures in the appended drawings, wherein.

DETAILED DESCRIPTION

DESCRIPTION OF A PREFERRED EMBODIMENT OF THE INVENTION

Figure 1:
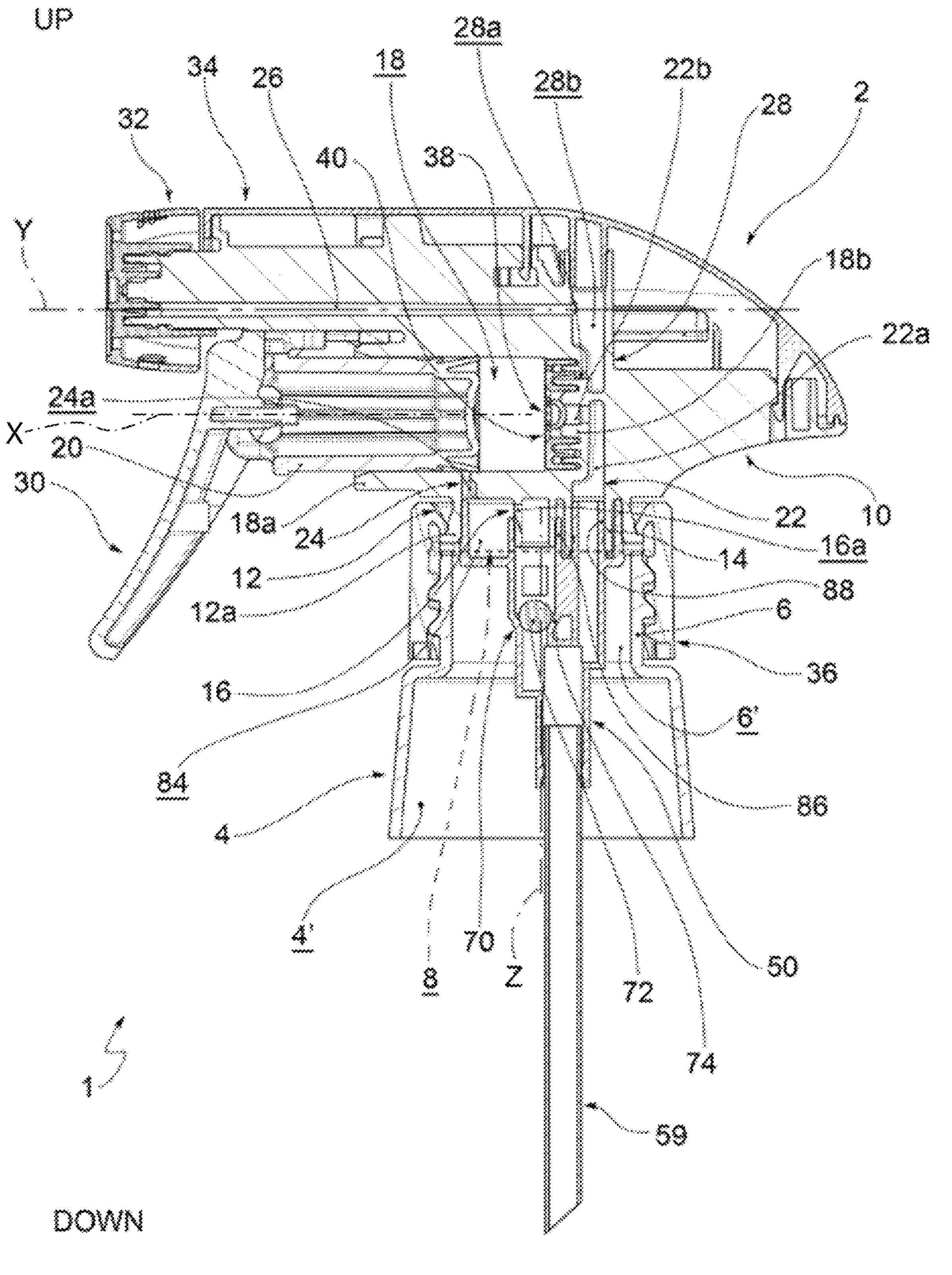
FIG. 1 is a sectional view of a dispensing device, according to an embodiment of the invention, in an "upright" configuration.

With reference to the figures in the attached drawings, the numeral 1 collectively denotes a trigger dispensing device for liquids, e.g., for household hygiene or care, personal hygiene or care, care for clothing, and the like.

The device 1 comprises a trigger dispensing head 2 and a bottle 4, having an inner bottle compartment 4', provided with a neck 6, which delimits a neck compartment 6', for the application of the head 2, for example by a threaded connection or by a bayonet connection. The neck 6 has a central vertical axis Z and ends with a neck opening 8.

The head 2 comprises a frame 10 for supporting the components, preferably made in one piece of plastic material. The frame 10 comprises a connecting portion 12 for connecting to the bottle 4, in particular for application to the neck 6. The connecting portion 12 comprises an annular connecting wall 12*a*, provided with an axis that, when the head 2 is mounted to the bottle 4, coincides with the vertical axis Z.

The frame 10 comprises a suction tube 14 protruding vertically from the connecting portion 12, radially internally with respect to the connecting wall 12*a*, preferably offset with respect to the vertical axis Z.

Additionally, the frame 10 comprises a venting tube 16 protruding vertically from the connecting portion 12, radially internally with respect to the connecting wall 12*a*, preferably offset with respect to the vertical axis Z. The venting tube 16 has a venting passage 16*a* through the thickness of the venting tube 16, facing the side of the first venting segment 24*a* of the venting conduit 24.

The venting tube 16 has, for example, an annular shape.

The venting tube 16 ends with a venting edge that delimits a venting mouth facing towards the bottle compartment 4'.

With the dispensing device in the "upright" configuration, the venting passage 16*a* is placed above the venting mouth.

The head 2 further comprises a pressure chamber 18, having a chamber axis X, preferably intersecting the vertical axis Z, for example orthogonally. The pressure chamber 18, delimited annularly by a chamber wall 18*a* and at the bottom by a chamber bottom 18*b*, is preferably obtained in the frame 10.

Preferably, the chamber wall 18*a* is made in one piece with the connecting portion 12. For example, the connecting wall 12*a* protrudes from the chamber wall 18*a* along the vertical axis Z.

The head 2 further comprises a piston 20 which may slide in a liquid-tight manner in the pressure chamber 18 between a retracted limit position, in which the volume of the pressure chamber 18 is at a maximum, and an advanced limit position, in which the volume of the pressure chamber 18 is at a minimum.

The head 2 further comprises a suction conduit 22, preferably obtained in the frame 10, to connect the bottle compartment 4*a* to the pressure chamber 18. The suction conduit 22 comprises a first suction segment 22*a*, wherein an initial part extends into the suction tube 14, parallel to the vertical axis Z, and a second suction segment 22*b*, parallel to the chamber axis X, which flows into the pressure chamber 18, passing through the chamber bottom 18*b*.

The head 2 further comprises a venting conduit 24, preferably obtained in the frame 10, to connect the bottle compartment 4*a* to the external environment. The venting conduit 24 comprises a first venting segment 24*a*, preferably vertical, which flows into the pressure chamber 18, penetrating the chamber wall 18*a*.

The venting conduit 24, e.g., the first venting segment 24*a*, passes through the connecting portion 12, e.g., in the chamber wall 18*a* of the pressure chamber 18.

The head 2 further comprises a dispensing conduit 26 for dispensing the product; the dispensing conduit 26, preferably obtained in the frame 10, extends along a dispensing axis Y, preferably intersecting the vertical axis Z, e.g., orthogonally.

The head 2 further comprises an outlet conduit 28 to connect the pressure chamber 18 and the dispensing conduit 26, preferably obtained in the frame 10. The outlet conduit 28 comprises a first outlet segment 28a, preferably parallel to the chamber axis X, which flows into the pressure chamber 18, passing through the chamber bottom 18*b*, and a second outlet segment 28*b*, preferably vertical, which connects the first outlet segment 28*a* and the dispensing conduit 26.

The head 2 further comprises:

- a trigger 30 for manual operation, suitable for moving the piston 20;
- elastic return means, suitable for permanently biasing the piston 20 towards the retracted limit position, preferably integrated with the trigger 30;
- a nozzle 32, fixed or rotatable, applied to the free end of the dispensing conduit 26 to give a predefined shape to the dispensed jet or to prevent dispensing by closing the dispensing conduit 26;
- a shell 34, attached to the frame 10 to cover the supported components;
- preferably, a ferrule 36 for the threaded connection of the frame 10 to the bottle 4;
- valve means 38 for regulating the flow of liquid from the bottle compartment 4*a* to the pressure chamber 18 and from the pressure chamber 18 to the dispensing conduit 26; said valve means 38 comprise suction valve means and dispensing valve means and consist, for example, of a single valve body 40, e.g., housed in the pressure chamber 18, applied to the chamber bottom 18*b* and cooperating with the suction conduit 22 and the outlet conduit 28.

An example embodiment of said valve means is described in the Italian patent application for invention No. 10 2022 000 021 228 in the name of the Applicant, the teaching of which regarding said valve means is incorporated herein for reference.

The head 2 further comprises an attachment 50, preferably made in one piece, of plastic material, which may be applied to the frame 10, and in particular to the connecting portion 12.

The attachment 50 extends along an attachment axis K between a lower end 52 and an upper end 54, suitable for connecting to the connecting portion 12 of the frame 10.

Proceeding from the lower end 52 to the upper end 54, the attachment 50 preferably first comprises a drawing attachment 56 coaxial to the attachment axis K, delimited by an annular drawing wall 58; the drawing attachment 56 is suitable for connection with a drawing tube 59 for suctioning the liquid product from the bottom of the bottle.

The attachment 50 then comprises an intermediate portion 60 having at least two chambers: an attachment suction chamber 62 and a multifunction chamber 66.

Preferably, the intermediate portion 60 protrudes axially from a base surface of the attachment 50, discussed below.

The attachment suction chamber 62 is in communication at the bottom with the drawing attachment 56, and at the top adapted to connect to the suction conduit 22 of the head 2, for example by engaging with the suction tube 14. In particular, the attachment suction chamber 62 extends along an attachment suction axis W, preferably parallel to and spaced apart from the attachment axis K, delimited annularly by an attachment suction wall 64.

The multifunction chamber 66 is in communication at the bottom with the drawing attachment 56, and at the top is suitable for connecting to the venting conduit 24 of the head 2, for example by engaging with the venting tube 16. In particular, the multifunction chamber 66 is in communication with the venting conduit 24 via the venting tube 16 and the venting passage 16*a*. Preferably, the multifunction chamber 66 extends along a multifunction axis Q, preferably parallel to and spaced apart from the attachment axis K, delimited annularly by a multifunction wall 67.

Preferably, the attachment axis K, the attachment suction axis W and the multifunction axis Q lie on the same imaginary plane; preferably, also, the attachment suction axis W and the multifunction axis 01 lie on different half-planes defined by the attachment axis K on said imaginary plane.

The multifunction chamber 66 has a first multifunction segment 66*a*, which is connected to the drawing attachment 56, and a second multifunction segment 66*b*, which is connected to the venting conduit 24 and the first multifunction segment 66*a*. The second multifunction segment 66*b* has a multifunction passage 66*c*, e.g., through the thickness, which connects the second multifunction segment 66*b* with the outside of the attachment 50, i.e., when the head is applied to the bottle, with the bottle compartment 4'.

The multifunction chamber 66 is fluidically in communication with the attachment suction chamber via an auxiliary passage 90, located below the multifunction passage 66*c*. For example, the auxiliary passage 90 passes through the thickness of the multifunction wall 67 and the attachment suction wall 64 and preferably passes through the drawing attachment 56.

The head 2 further comprises multifunction valve means 70 arranged and operating between the first multifunction segment 66*a* and the second multifunction segment 66*b*. For example, said multifunction valve means 70 comprise a shutter 72, e.g., consisting of a spherical body, and a valve seat 74, e.g., consisting of a narrowing, e.g., frustoconical narrowing, between the second multifunction segment 66*b* and the first multifunction segment 66*a*.

Finally, the attachment 50 comprises a connecting part 80 having an attachment connecting wall 82 that is annular with respect to the attachment axis K, but offset therefrom. The attachment connecting wall 82 is adapted to engage to the connecting portion 12 of the frame 10, preferably to the annular connecting wall 12*a*, such as by snap engagement or by shape or force fit coupling.

The attachment connecting wall 82 peripherally delimits an attachment compartment 84.

Also protruding into the attachment compartment 84 is a multifunction connecting tube 86, which delimits an end part of the second multifunction segment 66*b*, and a suction connecting tube 88, which delimits an end part of the attachment suction chamber 62. When the attachment 50 is applied to the frame 10, the multifunction connecting tube 86 is engaged with the venting tube 16 of the frame 10, in particular threaded thereon, while the suction connecting tube 88 is engaged with the suction tube 14 of the frame 10, in particular inserted therein.

Preferably, with the attachment 50 applied to the frame 10, the multifunction connecting tube 86 is engaged at the venting mouth of the venting tube 16.

The attachment connecting wall 82 extends around the attachment axis K and has, for example, an annular shape.

The attachment connecting wall 82 extends peripherally around the multifunction connecting tube 86 and the suction connecting tube 88, preferably detached therefrom in the radial direction with respect to the attachment axis K.

The attachment 50 comprises a base wall axially delimiting the connecting part 80. The base wall comprises an inner surface, facing the connecting portion 12 of the frame and is intended to remain dry, and an opposite outer surface, facing the bottle compartment 4' of the bottle 4 and is intended to be made wet by the product within the bottle compartment 4', in the "upside down"configuration of the dispensing device.

Along the attachment axis K, the attachment connecting wall 82, the multifunction connecting tube 86 and the suction connecting tube 88 protrude from the inner surface of the base wall of the attachment 50.

With the dispensing device in the "upright" configuration, the multifunction passage 66*c* is placed below the base wall of the attachment 50, e.g., proximal along the attachment axis K.

With the dispensing device in the "upright" configuration, the multifunction passage 66*c* is placed below the venting passage 16*a* of the venting tube 16.

When the attachment 50 is mounted to the frame 10, the attachment compartment 84 fluidically connects the multifunction chamber 66 and the venting conduit 24, in particular via the venting tube 16, the venting passage 16*a*, the attachment compartment 84, and the first venting segment 24*a*. Furthermore, the attachment suction chamber 62 is fluidically connected to the suction conduit 22.

With the attachment 50 mounted to the frame 10, the venting conduit 24, e.g. the first venting segment 24*a*, flows directly into the attachment compartment 84.

Moreover, when the head 2 is mounted to the bottle 4, the attachment 50 is at least partially accommodated within the bottle compartment 4'; in particular, the multifunction passage 66*c* is accommodated within the neck compartment 6' of the neck 6 of the bottle 4 and, preferably, the auxiliary passage 90 flows into the attachment suction chamber 62 at a height contained within the neck compartment 6'.

In a first operating configuration, or "upright" configuration (FIG. 1), the bottle is arranged below the head 2; the liquid product contained within the bottle compartment 4'rests on the bottom of the bottle and generally does not occupy the neck compartment 6'.

By repeatedly pressing and releasing the trigger 30, from a resting condition, the head 2 continuously passes from a dispensing phase to a suction phase and from the suction phase to the dispensing phase.

During the dispensing phase, the liquid product contained within the pressure chamber 18 is dispensed externally due to the fact that the pressure within the pressure chamber 18 causes the dispensing valve means to open, allowing the liquid product to travel from the outlet conduit 28 to the dispensing conduit 26 and then into the external environment. In the dispensing phase, the suction valve means are closed, thus preventing the return of the liquid product from the pressure chamber 18 to the bottle compartment 4'via the suction conduit 22.

During the suction phase, the vacuum in the pressure chamber 18 causes the suction valve means to open, allowing the liquid product to enter the pressure chamber 18.

During this phase, the liquid product rises from the bottom of the bottle through the drawing tube, passes through the drawing attachment 56, the attachment suction chamber 62, the suction conduit 22, and finally enters the pressure chamber.

Moreover, during this phase, the multifunction valve means are closed; in other words, the shutter 72 is housed in the valve seat 74 and closes the communication between the first multifunction segment 66*a* and the second multifunction segment 66*b*. This occurs by virtue of the vacuum exerted by the fluid within the attachment suction chamber 62, which is also transmitted into the first multifunction segment 66*a*, and, preferably, by virtue of the weight of the shutter 72.

In the "upright" configuration, the valve means 70 prevent communication between the venting passage 16*a* and the bottle compartment 4'located below the multifunction passage 66*c*, through the multifunction chamber 66 and the auxiliary passage 90.

Moreover, during a first period of the suction phase, the venting conduit 24 is in communication with the external environment (insofar as the first venting segment 24*a* is arranged upstream of the piston seals). Thus, the external environment is in communication with the bottle compartment 4' by means of the first venting segment 24*a* of the frame 10, the attachment compartment 84 of the attachment 50, the venting passage 16*a*, the venting tube 16, the second multifunction chamber 66*b*, and the multifunction passage 66*c*, which is not closed by the shutter 72.

Figure 2:
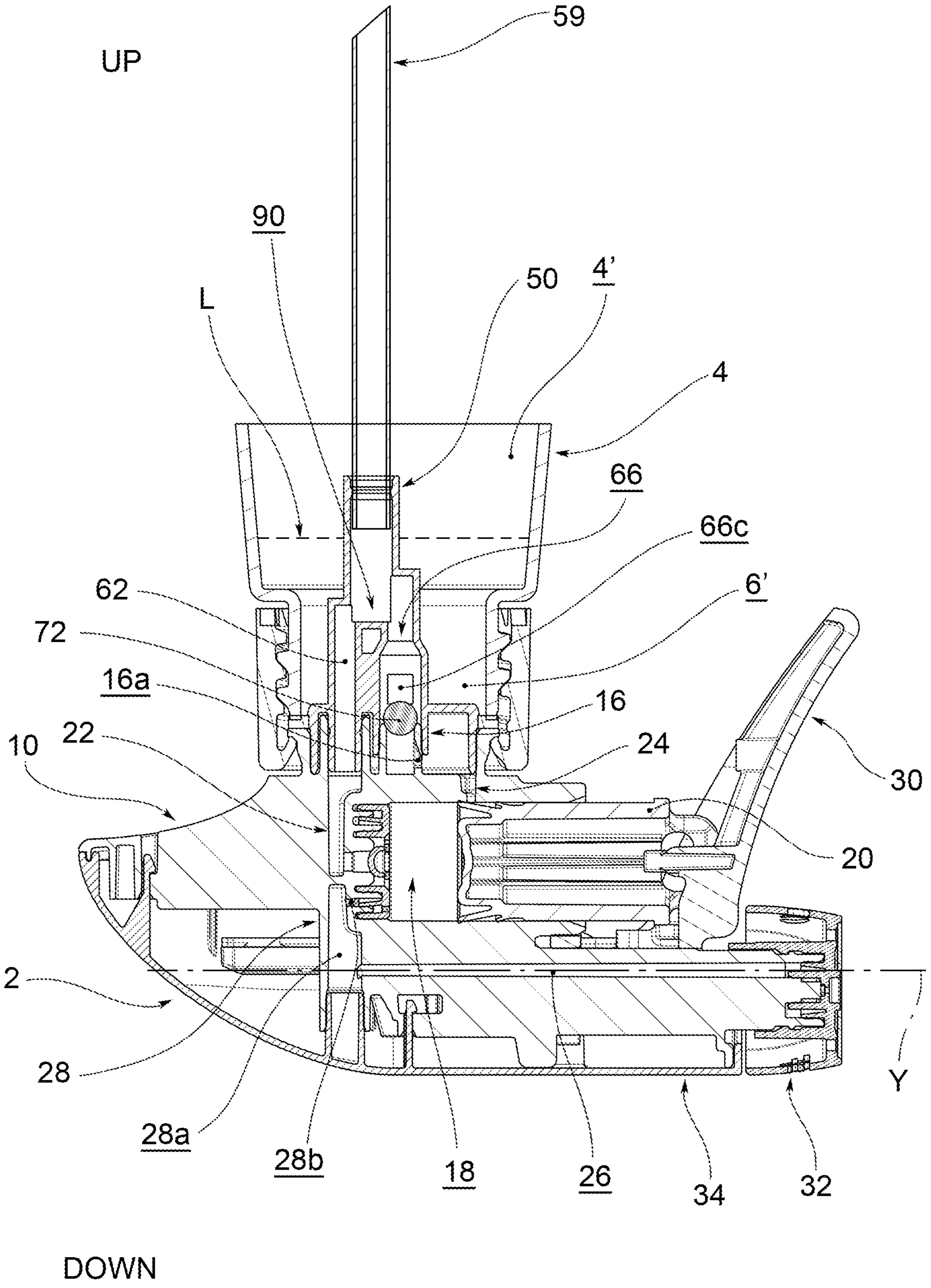
FIG. 2 is a sectional view of the dispensing device, in an "upside down"configuration.
Figure 4:
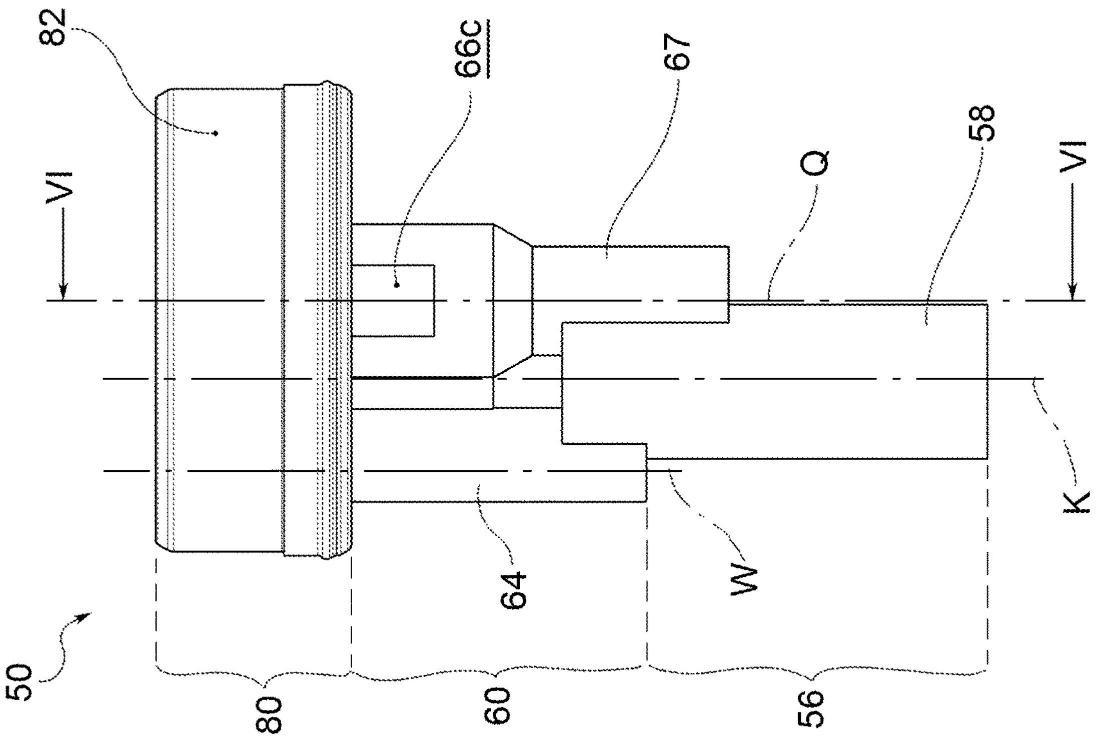
FIG. 4 is a side view of the attachment of FIG. 3.
Figure 3:
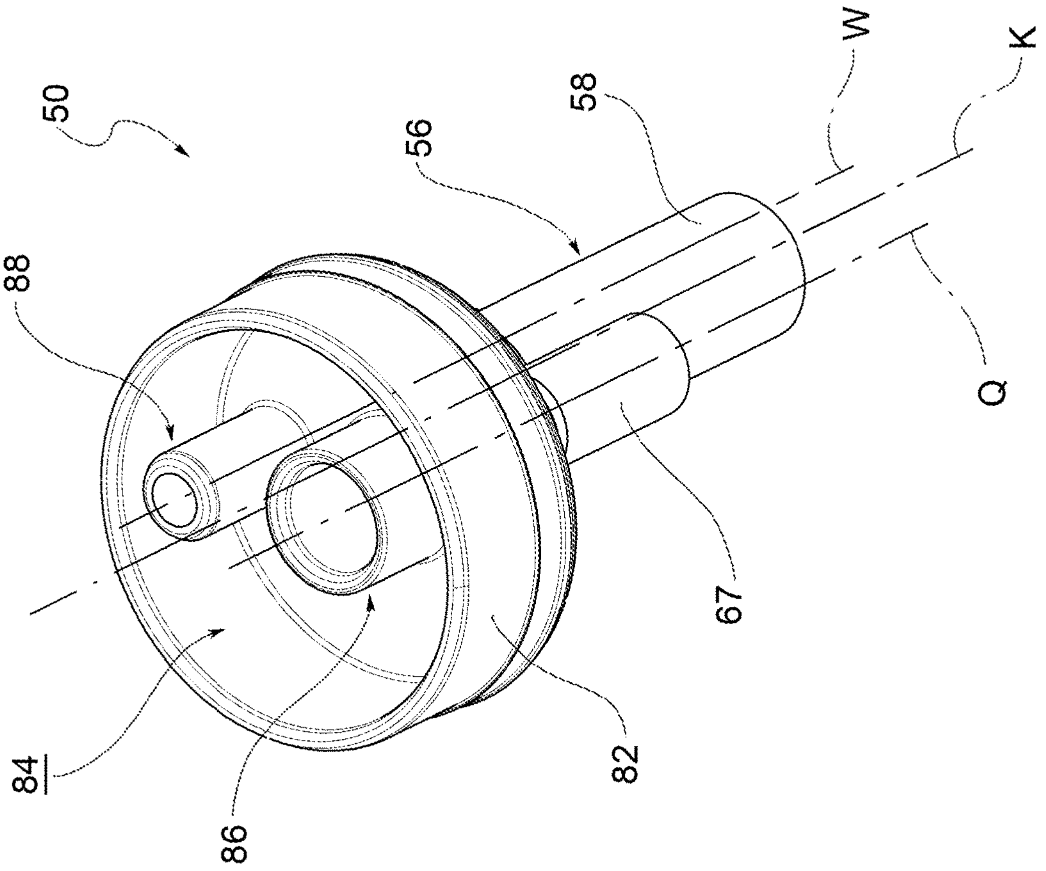
FIG. 3 shows an attachment of a trigger head of the dispensing device.
Figure 6:
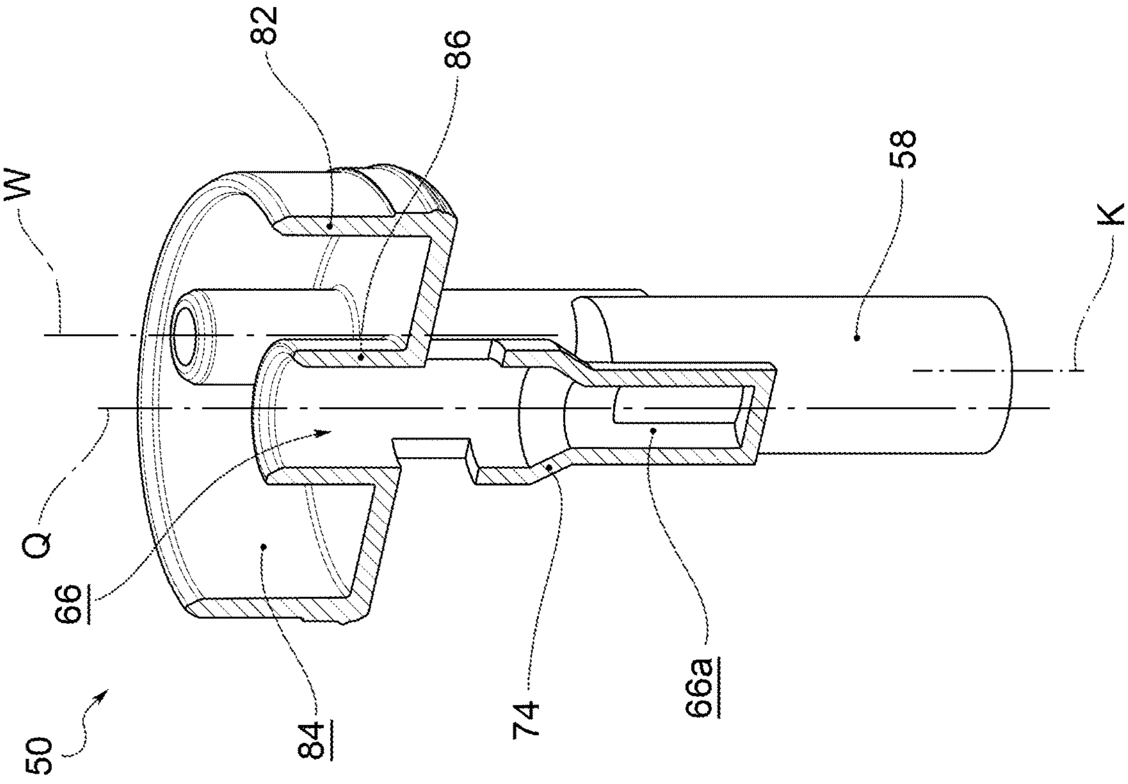
FIG. 6 is a partially cross-sectional view of the attachment of FIG. 3, according to the sectional plan VI-VI of FIG. 4.
Figure 5:
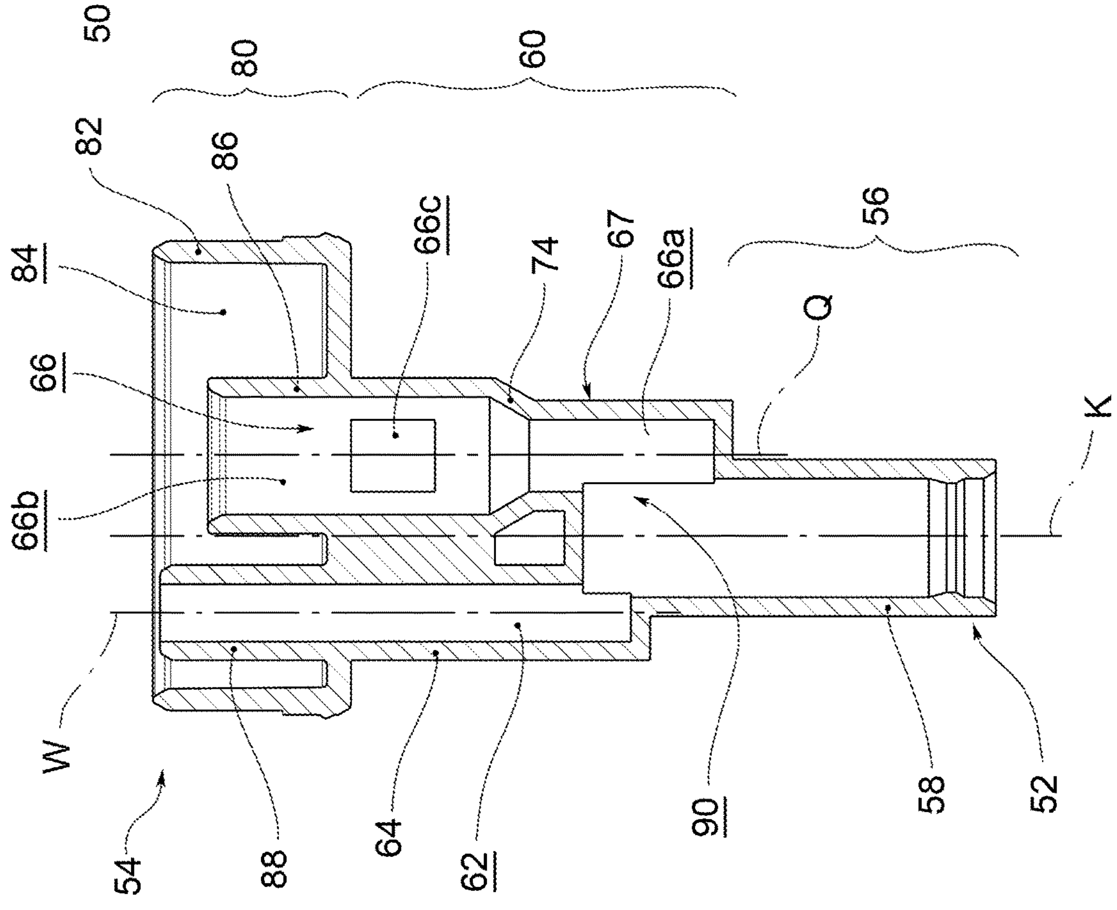
FIG. 5 is a sectional view of the attachment of FIG. 3.

In a second operating configuration, or "upside down" configuration (FIG. 2), the bottle is arranged above the head 2; the liquid product contained within the bottle is therefore deposited within the neck compartment 6'. For example, the liquid product contained within the bottle forms a free surface L.

The liquid product contained within the neck compartment 6'may thus enter the multifunction chamber 66 through the multifunction passage 66*c*, which is arranged below the free surface L. The passage to the venting conduit 24 is closed by the valve means 70, for example, by virtue of the shutter 72, which, at least by gravity, closes the passage between the multifunction chamber 66 and the venting tube 16, positioning itself at the venting mouth of the venting tube 16 so as to close it.

In the "upside down" configuration of the dispensing device, along the multifunction axis Q of the multifunction chamber 66, the shutter 72 is in an axial position between the multifunction passage 66*c* and the venting passage 16*a* of the venting tube 16, preventing communication.

In the "upside down" configuration of the dispensing device, the valve means 70 prevent communication between the venting conduit 24 and the bottle compartment 4'located above the multifunction passage 66*c*, through the multifunction chamber 66.

The liquid product thus flows into the attachment suction chamber 62, which is in fluid connection with the multifunction chamber 66 via the auxiliary passage 90 placed below the free surface L. The liquid product therefore occupies the suction conduit 22 by gravity, ultimately facing the pressure chamber 18.

By repeatedly pressing and releasing the trigger 30, from a resting condition, the head 2 continuously passes from a dispensing phase to a suction phase and from the suction phase to the dispensing phase.

During the dispensing phase, the liquid product already contained within the pressure chamber 18 is dispensed externally due to the fact that the pressure within the pressure chamber 18 causes the dispensing valve means to open, allowing liquid product to travel from the outlet conduit 28 to the dispensing conduit 26 and then into the external environment. In the dispensing phase, the suction valve means are closed, thus preventing the return of the liquid product from the pressure chamber 18 to the suction conduit 22.

During the suction phase, the vacuum within the pressure chamber 18 causes the suction valve means to open, allowing the liquid product, which already occupies the suction conduit 22, to enter the pressure chamber 18.

In such a configuration, the liquid leakage from the bottle to the outside is extremely limited or even nonexistent because the head 2 is applied in a liquid-tight manner to the neck 6, and the shutter 72 closes the transit to the venting conduit 24.

The restoration of the air within the bottle compartment will occur when the device is again used by the consumer in the "upright" configuration, through the venting conduit 24, the attachment compartment 84, the venting passage 16*a*, and the multifunction passage 66*c*.

Innovatively, the dispensing head described above meets the needs of the market, in that it allows the dispensing device to be used in an upside-down configuration as well, while overcoming the drawbacks mentioned above with reference to the prior art, in that the number of components enabling its operation is reduced and involves, in the embodiment illustrated, an attachment and a single ball shutter.

Advantageously, the dispensing head prevents accidental leakage of liquid product through the venting conduit, even during the movement between the "upright" and "upside down" configurations, such as due to internally moving components holding the liquid product and/or tilted positions or sudden movements and/or malfunctions.

Advantageously, under conditions other than the "upside down" configuration and the "upright" configuration, the movement of the liquid product to the venting conduit is hindered.

Advantageously, an effective USD system is achieved, by means of a single ball, even in structures where the venting passage and the suction conduit are widely spaced.

Further Embodiments of the Invention

According to an embodiment variant of the invention, the valve means consist of structurally separate components, e.g. a first flexible membrane of the suction means and a second flexible membrane of the dispensing means.

According to a further embodiment variant, the multifunction valve means comprise a flexible membrane or a plurality of flexible membranes.

According to a still further embodiment variant, the dispensing conduit and the outlet conduit coincide, that is, the outlet conduit is part of the dispensing conduit.

According to a still further embodiment variant, the attachment is in one piece with the frame.

According to an embodiment variant, a labyrinth seal is fluidically placed between the multifunction passage and the venting passage.

The invention claimed is:

1. A trigger head for a dispensing device for a liquid product, wherein the dispensing device comprises a bottle having a bottle compartment for containing the liquid product, the trigger head being applicable to the bottle, wherein the dispensing device is usable in an "upright" configuration, in which the trigger head is placed above the bottle compartment, and in an "upside down" configuration, and wherein the trigger head comprises:

a frame for supporting components, a pressure chamber for pressurizing the liquid product, a dispensing conduit for dispensing the liquid product to an external environment, a suction conduit for putting the bottle compartment in communication with the pressure chamber, an outlet conduit for putting the pressure chamber in communication with the dispensing conduit, a venting conduit for putting the bottle compartment in communication with the external environment, valve means for adjusting a flow of the liquid product from the suction conduit to the pressure chamber and from the pressure chamber to the outlet conduit, wherein the frame comprises a connecting portion for connecting to the bottle, and a venting tube projecting vertically from the connecting portion, and wherein the venting tube comprises a venting passage passing through a thickness of the venting tube;

an attachment comprising:

an attachment suction chamber in communication with the suction conduit;

a multifunction chamber adapted to be put in communication with the venting conduit and provided with a multifunction passage which puts the multifunction chamber in communication with the bottle compartment;

an auxiliary passage which puts the multifunction chamber and the attachment suction chamber in communication, placed under the multifunction passage in the "upright" configuration; and multifunction valve means operating in the multifunction chamber adapted in the "upright" configuration, to close a communication, through the multifunction chamber and the auxiliary passage, between the venting passage and the bottle compartment placed under the multifunction passage; and in the "upside down" configuration, to close a communication, though the multifunction chamber, between the multifunction passage and the venting passage, preventing a communication between the venting conduit and the bottle compartment placed above the multifunction passage.

2. The trigger head of claim 1, wherein the attachment is configured to be at least partially accommodated in the bottle compartment.

3. The trigger head of claim 2, wherein the attachment is configured so that the multifunction passage is accommodated in a neck compartment of a neck of the bottle.

4. The trigger head of claim 3, wherein the attachment is configured so that the auxiliary passage leads into the attachment suction chamber at a height comprised within the neck compartment.

5. The trigger head of claim 1, wherein the attachment further comprises a drawing attachment coaxial to an attachment axis, delimited by an annular drawing wall, suitable for connection with a drawing tube for suctioning the liquid product from a bottom of the bottle.

6. The trigger head of claim 5, wherein the attachment suction chamber extends along an attachment suction axis, parallel to and spaced from the attachment axis, and is annularly delimited by an attachment suction wall.

7. The trigger head of claim 5, wherein the multifunction chamber extends along a multifunction axis, parallel to and spaced from the attachment axis, and is annularly delimited by a multifunction wall.

8. The trigger head of claim 7, wherein the attachment suction chamber extends along an attachment suction axis, parallel to and spaced from the attachment axis, and is annularly delimited by an attachment suction wall, and wherein the attachment axis, the attachment suction axis, and the multifunction axis lie on a same imaginary plane.

9. The trigger head of claim 8, wherein the attachment suction axis and the multifunction axis lie on different half-planes defined by the attachment axis on the imaginary plane.

10. The trigger head of claim 7, wherein the attachment suction chamber extends along an attachment suction axis, parallel to and spaced from the attachment axis, and is annularly delimited by an attachment suction wall, and wherein the auxiliary passage passes through a thickness of the multifunction wall and of the attachment suction wall.

11. The trigger head of claim 10, wherein the auxiliary passage passes through the drawing attachment.

12. The trigger head of claim 1, wherein the multifunction valve means comprise a shutter, optionally the shutter consisting of a spherical body, and a valve seat for the shutter.

13. The trigger head of claim 12, wherein the valve seat consists of a frustoconical narrowing of the multifunction chamber.

14. The trigger head of claim 1, wherein the attachment further comprises a connecting part adapted to snap-engage the frame, comprising an annular attachment connecting wall peripherally delimiting an attachment compartment that puts the multifunction chamber in communication with the venting conduit.

15. The trigger head of claim 1, wherein the attachment is made in one piece of plastic material.

16. A dispensing device comprising:
a bottle for containing a liquid product; and
the trigger head of claim 1 applied to the bottle.

17. An attachment made in one piece of plastic material for a trigger head of a dispensing device for a liquid product, comprising:
at a top thereof, a connecting part comprising an annular attachment connecting wall peripherally delimiting an attachment compartment, and a base wall axially delimiting the connecting part;
at a bottom thereof, a drawing attachment coaxial to an attachment axis, delimited by an annular drawing wall;
an attachment suction chamber extending along an attachment suction axis, parallel to and spaced from the attachment axis, annularly delimited by an attachment suction wall, in connection at the bottom with the drawing attachment;
a multifunction chamber extending along a multifunction axis, parallel to and spaced from the attachment axis, annularly delimited by a multifunction wall, in connection at the bottom with the drawing attachment and provided with a multifunction passage passing through the multifunction wall, wherein the multifunction chamber comprises a second multifunction segment;
an auxiliary passage that puts the multifunction chamber and the attachment suction chamber in mutual communication at the bottom;
a multifunction connecting tube delimiting an end portion of the second multifunction segment, the multifunction connecting tube being configured to engage a venting tube of a frame of the trigger head; and
a suction connecting tube delimiting an end part of the attachment suction chamber, configured to engage a suction tube of the frame of the trigger head,
wherein the annular attachment connecting wall, the multifunction connecting tube, and the suction connecting tube protrude from an inner surface of the base wall, into the attachment compartment, and
wherein, with the multifunction connecting tube engaged to the venting tube, the attachment compartment is in air communication with the venting tube.

18. A trigger head comprising:
a frame for supporting components; and
the attachment of claim 17, applied by snapping to the frame.

19. A dispensing device for a liquid product, comprising:
a bottle for containing the liquid product; and
the trigger head of claim 18, applied to the bottle.

20. The attachment of claim 17, wherein the annular attachment connecting wall extends peripherally around the multifunction connecting tube and the suction connecting tube, detached therefrom, in a radial direction with respect to the attachment axis of the attachment.

21. The attachment of claim 17, wherein, with the multifunction connecting tube engaged to the venting tube, the attachment compartment puts the multifunction chamber in air communication with a venting conduit of the frame of the trigger head.

* * * * *